(12) United States Patent
Voorhees

(10) Patent No.: US 8,091,826 B2
(45) Date of Patent: Jan. 10, 2012

(54) AEROSTATIC BUOYANCY CONTROL SYSTEM

(76) Inventor: Michael Todd Voorhees, Boulder, CO (US)

( * ) Notice: Subject to any disclaimer, the term of this patent is extended or adjusted under 35 U.S.C. 154(b) by 572 days.

(21) Appl. No.: 12/107,665

(22) Filed: Apr. 22, 2008

(65) Prior Publication Data

US 2009/0114768 A1    May 7, 2009

Related U.S. Application Data

(60) Provisional application No. 60/913,784, filed on Apr. 24, 2007.

(51) Int. Cl.
*B64B 1/58* (2006.01)

(52) U.S. Cl. .......................................................... 244/97

(58) Field of Classification Search .................... 244/30, 244/31, 96–99
See application file for complete search history.

(56) References Cited

U.S. PATENT DOCUMENTS

| | | | |
|---|---|---|---|
| 33,165 A | 8/1861 | Sherman |
| 193,136 A | 7/1877 | Beckley |
| 202,750 A | 4/1878 | Pearson |
| 256,366 A | 4/1882 | Petersen |
| 784,161 A | 3/1905 | Honeywell |
| 817,442 A | 4/1906 | Page |
| 868,223 A | 10/1907 | Schiavone |
| 1,577,756 A | 3/1926 | Reagan |
| 1,629,843 A | 5/1927 | Silver |
| 1,633,238 A | 6/1927 | Bassett |
| 1,648,935 A | 11/1927 | Campau |
| 1,682,405 A | 8/1928 | Naatz |
| 1,682,961 A | 9/1928 | Hall |
| 1,686,084 A | 10/1928 | Hall |
| 1,687,204 A | 10/1928 | Hall |
| 1,700,096 A | 1/1929 | Liebert et al. |
| 1,727,210 A | 9/1929 | Many |
| 1,729,020 A | 9/1929 | Szymanski |
| 1,741,446 A | 12/1929 | Turner |
| 1,795,335 A | 3/1931 | Hall |
| 1,797,502 A | 3/1931 | Hall |
| 1,833,336 A | 11/1931 | Pupp |
| 1,884,614 A | 10/1932 | Donald |
| 1,902,519 A | 3/1933 | Powelson et al. |
| 1,925,133 A | 9/1933 | Burgess |
| 2,094,619 A | 10/1937 | Reichert et al. |

(Continued)

OTHER PUBLICATIONS

Gaston Tissandier, Le général Meusnier et les ballons dirigeables, La Nature, 1888, p. 232, Seizième année, deuxième semestre: n°783 à 808, Paris, France.

*Primary Examiner* — Timothy D Collins
*Assistant Examiner* — Valentina Xavier

(57) ABSTRACT

A system allowing for the active management of aerostatic lift in buoyant and semi-buoyant aerial vehicles comprised of a high tensile-strength outer pressure cell of a given volume and an inner compression cell of only slightly smaller dimensions. The inner compression cell is filled with a lifting gas, such as helium or hydrogen, to some fractional volume of its maximum, allowing for expansion of the lifting gas at different operational altitudes. When a reduction in aerostatic lift is desired, external air is compressed through the use of air handling means, and introduced into the outer pressure cell through a directional valve that prevents the pressurized air from leaving the pressure cell. When increased aerostatic lift is once again desired, the valve system may release all or a part of the pressurized air in the pressure cell, allowing the lifting gas to expand thereby displacing a greater volume of air and increasing lift.

10 Claims, 2 Drawing Sheets

U.S. PATENT DOCUMENTS

| | | |
|---|---|---|
| 2,180,036 A | 11/1939 | Dardel |
| 2,428,656 A | 10/1947 | Elliott et al. |
| 2,466,421 A | 4/1949 | Hall |
| 2,599,241 A | 6/1952 | Farmer |
| 3,620,485 A | 11/1971 | Gelhard |
| 4,012,016 A | 3/1977 | Davenport |
| 4,172,048 A | 10/1979 | Dunlap |
| 4,215,834 A | 8/1980 | Dunlap |
| 4,711,416 A | 12/1987 | Regipa |
| 4,773,617 A | 9/1988 | McCampbell |
| 4,934,631 A | 6/1990 | Birbas |
| 4,986,494 A | 1/1991 | Tockert |
| 5,143,322 A | 9/1992 | Mason |
| 5,199,667 A | 4/1993 | Fujii |
| 5,251,850 A | 10/1993 | Norén |
| 5,333,817 A | 8/1994 | Kalisz |
| 5,538,203 A | 7/1996 | Mellady |
| 6,016,991 A | 1/2000 | Lowe |
| 6,182,924 B1 | 2/2001 | Nott |
| 6,328,257 B1 | 12/2001 | Schafer |
| 6,354,535 B1 | 3/2002 | Perry et al. |
| 6,386,480 B1 | 5/2002 | Perry et al. |
| 6,402,090 B1 | 6/2002 | Aaron |
| 6,425,552 B1 | 7/2002 | Lee et al. |
| 6,427,943 B2 | 8/2002 | Yokomaku et al. |
| 6,581,873 B2 | 6/2003 | McDermott |
| 6,619,586 B1 | 9/2003 | Barnes |
| 6,648,272 B1 | 11/2003 | Kothmann |
| 6,666,405 B2 | 12/2003 | Isaacs |
| 6,698,686 B2 | 3/2004 | Ogawa et al. |
| 6,708,922 B1 | 3/2004 | Hamilton |
| 6,739,549 B2 | 5/2004 | Senepart |
| 6,792,872 B1 | 9/2004 | Valdespino |
| 6,860,449 B1 | 3/2005 | Chen |
| 7,055,778 B2 | 6/2006 | Eberle et al. |
| 7,487,936 B2 * | 2/2009 | Heaven, Jr. .................. 244/30 |

* cited by examiner

AEROSTATIC BUOYANCY CONTROL SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

Application of this invention would be useful in manned and unmanned airships and balloons or other buoyant and semi-buoyant vehicles, and relates to the reversible adjustment of aerostatic lift via pneumatic means without the use of offsetting ballast.

2. Description of the Related Art

The ability to economically adjust aerostatic lift has long been a goal of lighter-than-air vehicle designers. It is especially useful in asymmetric cargo operations where payloads may be exchanged without the use of offsetting ballast. Operations such as transport of materiel from military bases into a combat theater of operations or from pre-positioned naval ships to land based assembly areas necessitate asymmetric capabilities. Delivery of humanitarian disaster relief supplies and the application of water, slurry, foam, or fog for aerial fire suppression operations also require asymmetric capabilities. In sport ballooning, small changes in lift allow maneuver to different altitudes to facilitate exploitation of favorable winds. In hot air balloons this is achieved through variable input of heat, however in gas balloons, it has largely been limited to the venting of lifting gas or the release of ballast. With the current invention, such adjustments could be made continuously without depletion of ballast. Similar needs may face the emerging market of high altitude aerial telecommunications and surveillance platforms. With available solar energy to power the current invention, such altitude adjustments could be made indefinitely.

Control of buoyancy in lighter-than-air flight has been a subject explored extensively since the first flights of the montgolfiere and charliere balloons in 1783. In both the early montgolfieres and modern hot air balloons buoyancy control is achieved through variable input of heat. This process alters the density of air inside the balloon and thus affects the balloon's lift. After first conducting trials with ground-based fires, later techniques used in-flight fires of straw and other items placed in a small onboard wire basket. The method was difficult to control and provided limited heat, but effectively demonstrated the potential of hot air balloons. It was not until 1960 that Ed Yost ushered in the era of modern hot air ballooning with the use of a propane burner, providing much greater energy density and controllability. In charlieres or gas balloons, lift is provided by the lower molecular weight and density of the lifting gas, such as hydrogen or helium. In these systems buoyancy control has largely been limited to the venting of lifting gas and the release of ballast. With relatively cheap hydrogen or coal gas used in the 1800s, this method was practical. An effort to combine the two aerostatic balloon systems of hot air and gas was undertaken by Jean Francois Pilâtre de Rosier, himself the first aeronaut (along with the Marquis D'Arlandes), who in 1785 built what became known as the rosiere balloon. While his flight ended tragically with the vehicle catching fire and Pilâtre falling to his death, it was a modern rosiere balloon, the Breitling Orbiter III, using helium and a propane burner system that finally completed a round the world balloon flight in 1999.

Interestingly, on Dec. 3, 1783, the same year of the first manned balloon flights, a French military officer and aeronautical theorist, Jean-Baptiste-Marie-Charles Meusnier de la Place proposed the first elongated ellipsoidal balloon for the purpose of making it steerable, or dirigible. His design was presented to the French Academy of Sciences, and included the use of an envelope divided by an ellipsoidal hemispheric diaphragm, which was called a ballonet. It was proposed that the upper portion of the divided envelope could be filled with lifting gas, (at the time hydrogen) and the lower portion could be variably filled with air from the surrounding atmosphere through the use of an air pump. Ostensibly this was to serve two purposes. The first was to maintain the streamlined shape of the airship. As the airship rose in altitude, the lifting gas would expand. As it did, the pressure from the lifting gas would force air to escape from the air filled portion and the streamlined shape would remain taught without bursting. As the airship descended, the lifting gas would contract. In order to keep the envelope of the airship from becoming flaccid and bending or deforming, air would be pumped in to the lower portion to maintain pressure and shape. The second purpose Meusnier proposed was that the method might be used to deliberately control buoyancy. Muesnier's design was never built, partly due to his early death nine years later, but also due to technical challenges. The availability of air pumps with high flow rates, sufficient pressure, and of lightweight construction would not occur for decades and the tensile strength and impermeability of fabric of the time was insufficient for sustaining pressure differentials necessary for significant buoyancy control. 68 years would pass before the first successful airship was flown, but since his initial design, all successful non-rigid and semi-rigid airships have incorporated some form of ballonet to maintain a streamlined shape. The only significant modifications have been a reduction in scale of the ballonet and the combined use of both fore and aft ballonets to allow for trim adjustment (pitching the nose up or down), which would then impart aerodynamic forces to adjust altitude, but the ballonet would not serve as an effective direct lift control system for other than minor adjustments. In airships, as in charliere gas balloons, aerostatic buoyancy control was to be accomplished through release of ballast and venting of gas.

Rigid airship manufacturers and operators, including Luftsciffbau Zeppelin Gmbh of Germany, adopted these same buoyancy control methods. Their airships, which became known as zeppelins, controlled lift primarily through the use of conventional aerostatic means. Hydrogen was vented through valves on the top of the airship, reducing lift, and ballast water was released to increase lift. Additionally, the airship could be flown with the nose pitched up or down by using aerodynamic elevators, creating positive or negative aerodynamic lift, but in so doing inducing significant drag, thus reducing the efficiency of the airship. As the shape of the airship was maintained by its rigid structure, there was no obvious need for the ballonet.

The discovery of helium, a nonflammable gas with perceived safety advantages first identified on Earth in 1895, led to its use in 1921 by the United States Navy in the pressure airship C-7. It became immediately apparent that the practice of venting helium would be quite expensive and other techniques were required for economical operation. As the Navy embraced helium for its rigid airships beginning with the Shenandoah, first flown in 1923, they incorporated an exhaust gas water recovery system to help offset the consumption of fuel and resulting decrease in weight during a flight. Experience with this ship lead to design innovations in the later airships Akron and Macon, including an improved exhaust gas water recovery system facilitated by the placement of the engines within the hull. While these methods were sufficient for replacing the weight of fuel consumed in flight, it could not be employed for significant asymmetrical cargo operations.

Other proposed prior methods have included the direct compression of either the lifting gas or air into small high-pressure storage containers. It has generally been found that such pressurization requires heavier and more energy intensive compressors, heavy storage containers, and often the use of gas cooling and heating systems to remove or add heat to the gases undergoing anisothermal volumetric change. Because the current invention requires applying only relatively small changes in pressure upon a larger volume, the required materials add less weight and the system uses less power. Another proposed prior method involves the intake and expulsion of water for use as ballast. Such a system is complex, expensive, heavy, and susceptible to fouling, and has many practical limitations including the availability of water at cargo destinations. A third proposed prior method has been the combination of aerodynamic lift with a lighter-than-air vehicle. Rather than merely operating a symmetrical airship with the nose pitched up as before, such designs incorporate a lifting-body geometry. Such hybrid designs have been proposed specifically to handle the asymmetric lift problem, however they introduce more problems than they solve. Namely, the hybrid suffers induced drag that results from aerodynamic lift and requires forward momentum to become airborne. The significant decrease in efficiency due to induced drag alone makes the hybrid vehicle approach economically less attractive.

BRIEF SUMMARY OF THE INVENTION

A system allowing for the active management of aerostatic lift in buoyant and semi-buoyant aerial vehicles comprised of a high tensile-strength outer pressure cell of a given volume and an inner compression cell of only slightly smaller dimensions. The inner compression cell is filled with a lifting gas, such as helium or hydrogen, to some fractional volume of its maximum, allowing for expansion of the lifting gas at different operational altitudes. When a reduction in aerostatic lift is desired, external air is compressed through the use of air handling means, and introduced into the outer pressure cell through a directional valve that prevents the pressurized air from leaving the pressure cell. When increased aerostatic lift is once again desired, the valve system may release all or a part of the pressurized air in the pressure cell, allowing the lifting gas to expand thereby displacing a greater volume of air and increasing lift. Importantly, no appreciable pressure differential is imposed across the inner compression cell membrane containing the lifting gas; therefore permeation rates are kept to a minimum. As the induced pressure is relatively small, little work is performed on the gas, and thus less energy is required than for high-pressure systems. Also, because the inner cell is concentric with the outer cell, it is unnecessary to house external pressure chambers enclosed within the volume of the hull, resulting in more available lift for a given size of aircraft.

BRIEF DESCRIPTION OF THE SEVERAL VIEWS OF THE DRAWINGS

FIGS. 1-4 illustrate an Aerostatic Buoyancy Control System of the present invention. Like numerals identify identical items throughout the figures.

FIG. 2a represents the system with the inner compression cell membrane 3 filled to 75% capacity by volume while at ambient pressure at Mean Sea Level under standard atmospheric conditions, the lower portion of the cell reaching spatial equilibrium at position X. In this configuration the system would be at its maximum aerostatic lift.

FIG. 2b represents the system with the inner compression cell membrane 3 initially filled to 75% capacity by volume, but now pressurized at 0.2 atmospheres gauge pressure at Mean Sea Level under standard atmospheric conditions, the lower portion of the cell reaching spatial equilibrium at position W. In this configuration the system would be at its Minimum aerostatic lift, if given a design limit of 0.2 atmospheres gauge pressure.

FIG. 2c represents the system with the inner compression cell membrane 3 initially filled to 75% capacity by volume, but now at ambient pressure at 9,600 feet MSL under standard atmospheric conditions, the lower portion of the cell reaching spatial equilibrium at position Z, substantially occupying the entire volume of the outer pressure cell. In this configuration the system would also be at its maximum aerostatic lift, substantially equal to that of the system in FIG. 2A.

FIG. 2d represents the system with the inner compression cell membrane 3 initially filled to 75% capacity by volume, but now pressurized at 0.2 atmospheres gauge pressure at 9,600 feet MSL under standard atmospheric conditions, the lower portion of the cell reaching spatial equilibrium at position Y. In this configuration the system would also be at its Minimum aerostatic lift, substantially equal to that of the system in FIG. 2b, again if given a design limit of 0.2 atmospheres gauge pressure.

DETAILED DESCRIPTION OF THE INVENTION

Figure 1A:
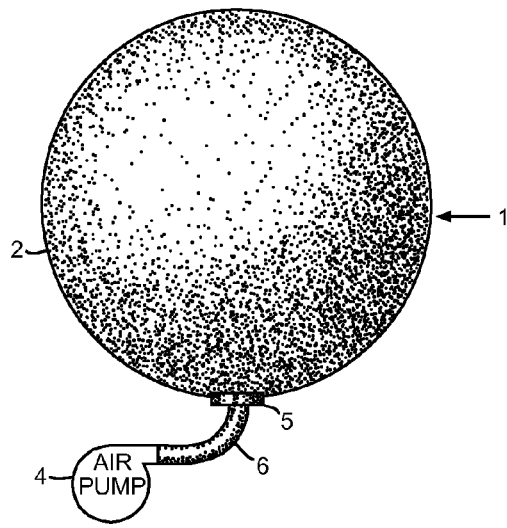
FIG. 1a shows the external perspective view of the Aerostatic Buoyancy Control System 1 in communication with prior art components (air pump 4, variable direction valve system 5, and optional connection hose 6).
Figure 1B:
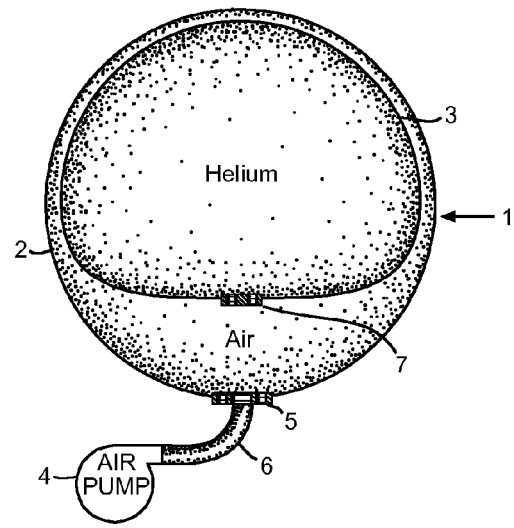
FIG. 1b shows the system from the same viewpoint, but in cross section whereby the sphere and components have been sectioned in half, revealing the relative position of the partially filled inner compression cell membrane 3 to the outer pressure cell membrane 2 under non-pressurized conditions at sea level.

Referencing FIG. 1b, this invention is an aerostatic buoyancy control system 1 allowing for the active management of aerostatic lift in buoyant and semi-buoyant aerial vehicles. It utilizes an outer pressure cell 2 made of high tensile strength air-impermeable membrane of a given volume, and an inner compression cell 3 made of flexible lifting-gas-impermeable membrane and of only slightly smaller dimensions than the outer pressure cell 2.

Figure 2A:
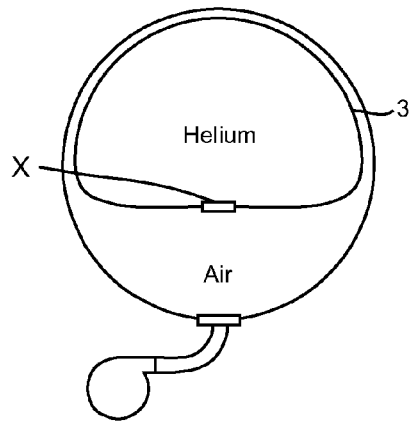
FIGS. 2a-2d show schematic diagrams for the purpose of illustrating the range of motion of the inner compression cell membrane under different operational conditions.

The inner compression cell 3 is filled with a lifting gas, such as helium or hydrogen, via a gastight valve system 7 to some fractional volume of its maximum capacity at Mean Sea Level, as shown in FIG. 2a, which depicts a 75% fill, with the lower portion of the inner compression cell 3 reaching spatial equilibrium at position X. This allows for expansion of the lifting gas at different operational altitudes. The outer pressure cell 2 communicates with the outside atmosphere via a closeable and directional valve system 5. When the valve system 5 is fully open, the pressure of both the air in the outer pressure cell 2 and the lifting gas in the inner compression cell 3 will achieve a state of equilibrium with that of the pressure of the atmosphere at the altitude of the system.

Figure 2B:
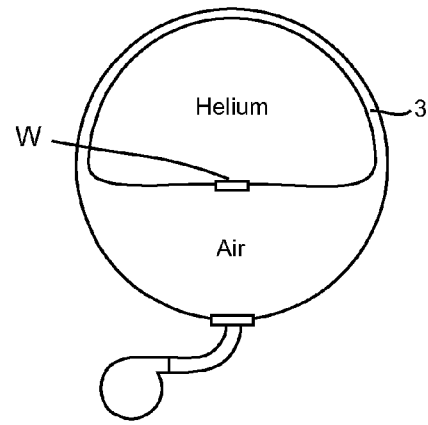
Figure 2C:
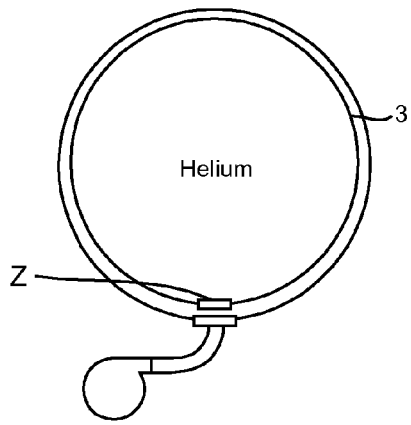

At higher altitudes where the atmospheric pressure is lower, the lifting gas in the inner compression cell 3 will expand, thus displacing the air in the outer pressure cell 2 and forcing that air to exit the valve system 5, resulting in the arrangement shown in FIG. 2c, with the lower portion of the inner compression cell 3 reaching spatial equilibrium at position Z.

At lower altitudes where atmospheric pressure is greater, the lifting gas will contract, thus allowing air to enter the outer pressure cell 2, returning to the state shown in FIG. 2a when at Mean Sea Level.

Figure 2D:
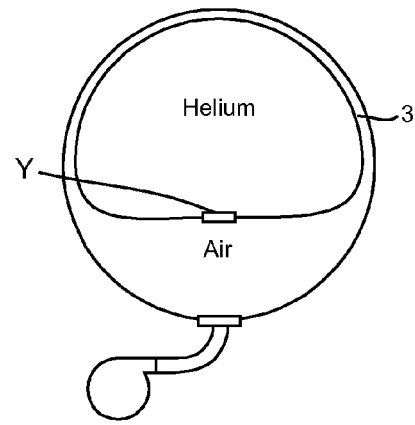

When a reduction in aerostatic lift is desired, external air is compressed through the use of an air pump, compressor, blower, or other air handling means 4, and introduced into the outer pressure cell 2, optionally via connection hose 6 through a directional valve 5 that prevents the pressurized air from leaving the pressure cell. Consequently, the lifting gas in the inner compression cell 3 will equilibrate to the pressure of the air in the outer pressure cell 2 while simultaneously contracting in volume as governed by Boyle's Law, as shown in FIG. 2b for conditions at Mean Sea Level with the lower portion of the inner compression cell 3 reaching spatial equilibrium at position W, and as shown in FIG. 2d for conditions at 9,600 feet above Mean Sea Level with the lower portion of the inner compression cell 3 reaching spatial equilibrium at position Y. Because the density of the lifting gas in the inner compression cell 3 has subsequently increased and displaces less air, and the density of the air in the outer pressure cell 2 has increased thus increasing its mass, a reduction of lift occurs proportional to the pressure and volume of the system.

When increased aerostatic lift is once again desired, the valve system 5 may release all or a part of the pressurized air in the outer pressure cell 2, allowing the lifting gas in the inner compression cell 3 to expand, thereby displacing a greater volume of air and increasing lift.

Figure 3A:
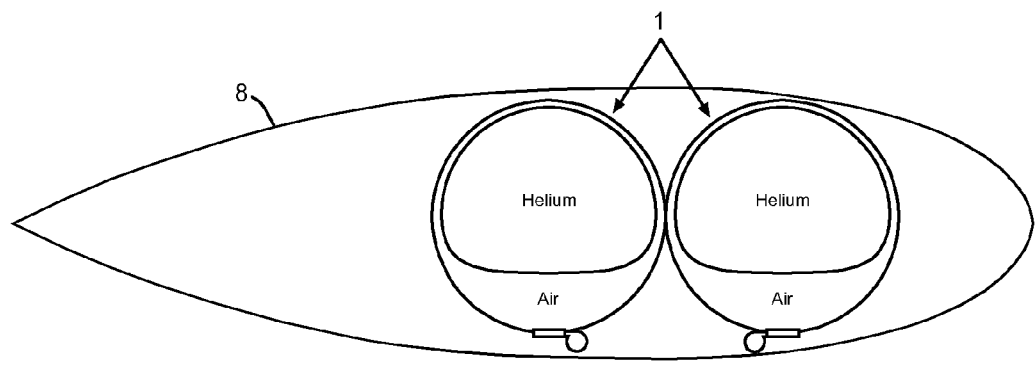
FIGS. 3a and 3b depict schematically the possible arrangement of two Aerostatic Buoyancy Control System assemblies located within the hull of an airship 8, under both ambient (maximum lift) and pressurized (reduced lift) conditions respectively.
Figure 3B:
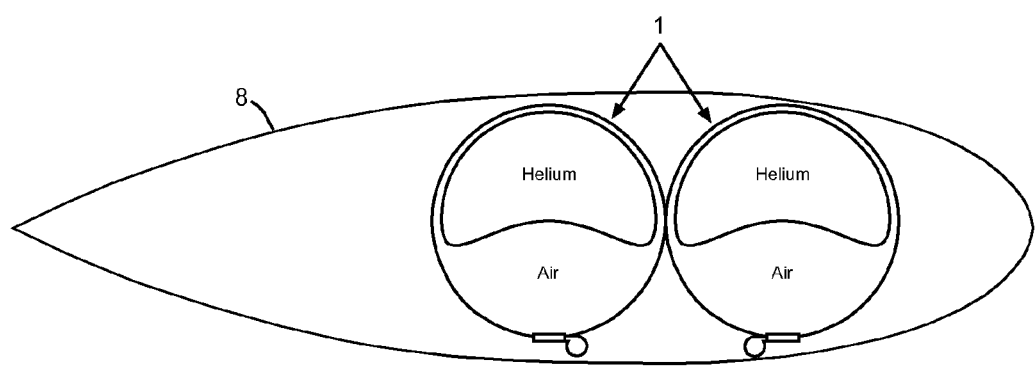
Figure 4A:
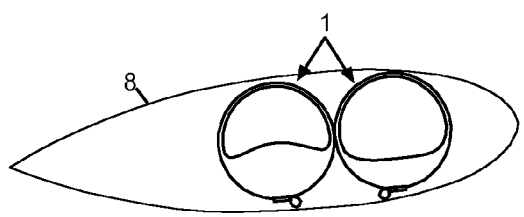
FIGS. 4a and 4b show schematically how the fore and aft assemblies can be differentially pressurized to adjust the pitch of the airship 8.
Figure 4B:
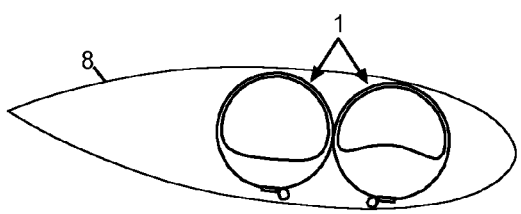

As shown in FIGS. 3a and 3b, multiple aerostatic buoyancy control systems 1 can be used in unison to provide greater or lesser lift respectively while maintaining level flight. Alternately they may be differentially pressurized to achieve an upward pitch at the bow as in FIG. 4a, or a downward pitch at the bow as in FIG. 4b, or to compensate for a shift in the vehicle's center of mass while maintaining level flight.

An important feature of this system is that the pressure differential across the inner compression cell 3 membrane does not increase relative to the pressure of air in the outer pressure cell 2. It remains at or near zero, and thus the permeability of the inner compression cell 3 with respect to the lifting gas does not increase. This is significant in keeping lifting gas permeation rates as low as possible to reduce the costs associated with lifting gas replacement. In the case where helium is used as the lifting gas, such costs would be non-trivial for large volume systems. Also, as the induced pressure is relatively small, little work is performed on the gas, and thus less energy is required than for high-pressure systems. This further contributes to the efficient and economical control of buoyancy. And because the inner cell is concentric with the outer cell, it is unnecessary to house external pressure chambers enclosed within the volume of the hull, resulting in more available lift for a given size of aircraft. Since viscous drag is proportional to aircraft hull surface area, which itself is driven by the enclosed volume of the aircraft, the present invention helps to minimize drag upon the aircraft.

When the system is used in an airship, it will allow for the handling of asymmetric payload operations, facilitate landing and ground operations, and adjust aerostatic lift in response to changes in equilibrium due to fuel consumption, solar heating, radiative cooling, and differing atmospheric conditions. When used in a balloon for lift adjustments, it facilitates operations at precise altitudes with favorable winds and can compensate for changes in equilibrium due to fuel consumption, solar heating, radiative cooling, and differing atmospheric conditions. It can also accommodate changes in payloads and passengers. When employed in a high altitude aerial platform designed for telecommunications, remote sensing, directed energy operations, the launching of aerospace vehicles, or other scientific or surveillance purposes, it allows for operations at precise altitudes with favorable winds and the adjustment of aerostatic lift to compensate for changes in equilibrium due to fuel consumption, solar heating, radiative cooling, and differing atmospheric conditions, or changes in payload.

What I claim as my invention is:

1. An aerostatic buoyancy control system for lighter-than-air or hybrid vehicles comprising:

an outer pressure cell made of a high tensile strength air-impermeable membrane consisting of fabric, film, laminate or other materials, the outer pressure cell being permeable to lifting gas;

an inner compression cell made of a flexible lifting-gas-impermeable membrane consisting of fabric, film, laminate or other materials and of only slightly smaller dimensions than the outer pressure cell, wherein the lifting gas of the buoyancy control system contained within the inner compression cell comprises either all or a part of the total lifting gas used for aerostatic lift by the vehicle;

an airtight sealable means for insertion and/or removal of the inner compression cell into and out of the outer pressure cell;

a gastight valve system for the inflation or deflation of the inner compression cell with lifting gas, such as helium or hydrogen;

an airtight valve system on the outer pressure cell that can allow alternately the inflow of higher pressure air into the pressure cell without release of said air, controlled release of all or part of the stored higher pressure air from within the pressure cell, or free flow of air into and out of the pressure cell;

an air compression means connected either directly or indirectly to the airtight valve system on the outer pressure cell, such as a mechanical or acoustic compressor or regenerative or centrifugal blower with accompanying or integral motor and power supply.

2. An aerostatic buoyancy control system of claim 1 wherein the system consists of multiple said pressure and compression cell pairs either separate or in pneumatic communication with each other, which may be used to adjust the pitch or roll of an airborne system in addition to overall buoyancy.

3. An aerostatic buoyancy control system of claim 1 wherein the pressure and compression cells are spherical in shape.

4. An aerostatic buoyancy control system of claim 1 wherein the pressure and compression cells are ellipsoidal in shape.

5. An aerostatic buoyancy control system of claim 1 wherein the pressure and compression cells are generally cylindrical in shape.

6. An aerostatic buoyancy control system of claim 1 wherein the system includes an integrated powered control system for the compression means and/or the valve system.

7. An aerostatic buoyancy control system of claim 1 wherein the system includes an integrated manual control system for the compression means and/or the valve system.

8. An aerostatic buoyancy control system of claim 1 wherein the system is used in an airship for the handling of asymmetric payload operations, to facilitate landing and ground operations, and to adjust aerostatic lift in response to changes in equilibrium due to fuel consumption, solar heating, radiative cooling, and differing atmospheric conditions.

9. An aerostatic buoyancy control system of claim 1 wherein the system is used in a balloon for lift adjustments in order to operate at precise altitudes with favorable winds; to adjust aerostatic lift in response to changes in equilibrium due to fuel consumption, solar heating, radiative cooling, and differing atmospheric conditions; or to accommodate changes in payloads.

10. An aerostatic buoyancy control system of claim 1 wherein the system is used in a high altitude aerial platform designed for telecommunications, remote sensing, directed energy operations, the launching of aerospace vehicles, or other scientific or surveillance purposes, in order to operate at precise altitudes with favorable winds and to adjust aerostatic lift based on changes in equilibrium due to fuel consumption, solar heating, radiative cooling, and differing atmospheric conditions, or changes in payload.

* * * * *